United States Patent [19]

Morton

[11] 4,351,314

[45] Sep. 28, 1982

[54] PORTABLE HEATER

[76] Inventor: David C. Morton, 3152 Curtis Dr., Flint, Mich. 48507

[21] Appl. No.: 244,274

[22] Filed: Mar. 16, 1981

[51] Int. Cl.³ .............................................. F24C 1/16
[52] U.S. Cl. ........................................ 126/59; 126/2; 126/111; 126/9 A
[58] Field of Search ................ 126/59, 25 R, 29, 9 R, 126/9 A, 9 B, 2, 3, 36, 111, 58, 208, 206, 367, 59.5, 49, 65, 67; 110/262

[56] References Cited

U.S. PATENT DOCUMENTS

| | | | |
|---|---|---|---|
| 1,446,353 | 2/1923 | Slocum | 126/9 B |
| 1,925,682 | 9/1933 | Upright | 126/59.5 |
| 1,934,339 | 11/1933 | Winberg | 126/59.5 |
| 2,738,260 | 3/1956 | Wolfson et al. | 126/59.5 |
| 3,062,200 | 11/1962 | Miller | 126/59.5 |
| 3,868,943 | 3/1975 | Hottenroth | 126/9 R |
| 4,174,702 | 11/1979 | Rappaport | 126/208 |

FOREIGN PATENT DOCUMENTS 1125129  3/1962  Fed. Rep. of Germany ..... 126/9 R

*Primary Examiner*—Samuel Scott
*Assistant Examiner*—G. Anderson
*Attorney, Agent, or Firm*—Harry R. Dumont

[57] ABSTRACT

A heater usable for indoor and outdoor use including a body having an upper and a lower portion. The two portions are separated by a grate adapted to support a solid fuel within the upper portion. The lower portion is operable to receive a receptacle for a lighted semi-solid fuel. The heater can be used in two modes, in a high heat output mode in which the solid fuel is first lit by the semi-solid fuel that is then removed or in a lower heat output mode in which the upper solid fuel is dispensed with and the heat is given off by the lower portion semi-solid fuel receptacle only. The upper portion of the heater is selectively closed or opened by a lid to allow heating operation or to provide damping operation when the lid is in its lowered position.

6 Claims, 5 Drawing Figures

PORTABLE HEATER

BACKGROUND OF THE INVENTION

It has long been desirable to have a portable hand warmer that is economical of fuel and capable of providing heat at both higher and lower levels. The present invention relates to such a portable heater and has for one object a provision for dual fuel burning capabilities. It is first possible to provide heating at a relatively low heat level through the use of a heating medium of a semi-solid type such as canned heat or "Sterno". The second source of heat which optionally may be included in the heater is provided by charcoal, coal or other solid fuel which is placed in the upper portion of the heater on the grate separating such portion from the lower portion. In the operation of the heater, a slow-burning long-lasting heat of higher level is provided when the upper solid fuel is ignited.

It is further possible to provide almost instant heat for hand or body warming by igniting the semi-solid fuel and allowing it to burn within the lower portion of the heater while being held in an easily removable but securely clipped arrangement in the base.

When it is desired to change over from the lower heat level operation, solid fuel is introduced in the upper portion on top of the grate, the semi-solid fuel such as canned heat or "Sterno" is then used as the igniting agent for the charcoal. At this point the portable heater produces instant heat and at the same time the charcoal or other solid fuel begins its own burning cycle. When the charcoal or other solid fuel is properly ignited, the semi-solid fuel is removed from its clipped position in the base and readily extinguished keeping it available to be used again as a starting agent for the charcoal or other solid fuel. It will be understood that at least two or three hours of reliable heat can be obtained from a small size heater employing charcoal or other solid fuel positioned in the upper portion above the grate.

It will likewise be seen that this invention has the capability of transporting the charcoal or other solid fuel preset on the grate and held in place when the upper lid is in a closed position. Also it is possible to transport the heater including the igniting source of semi-solid fuel held in position by its own retaining clips mounted in the lower portion of the heater. Thus a lightweight, compact, easily operable heating package is provided. It is also important to note that this invention eliminates the requirement for starting fluids or other highly inflammable materials or their being carried upon the person of the user.

The present invention thus provides a heat source that is high in the volume of heat produced yet relatively small in size and weight and exceedingly portable. The fastening means for the lid of the portable heater may be a snap-ring which allows easy engagement or disengagement of the top depending on the operation desired. The solid or air-tight top plate when it is raised allows for a maximum air circulation and for maximum heat production.

A belt attachment ring connected to the upper part of the heater to aid in its carrying. In conjunction with the improved mobility, the belt loop further serves as a means for handling the heater when it is hot.

Prior art arrangements are known for heaters which are relatively portable and incorporate solid or semi-solid fuels. One such type of heater is shown and disclosed in L. B. Skinner U.S. Pat. No. 1,482,586 issued on Feb. 5, 1924, for "Orchard Heater". The heater disclosed in that application however requires the use of an inflammable fluid for igniting a solid fuel and does not have the dual heating level capability of the present invention.

A further similar device is shown and described in R. N. Frank U.S. Pat. No. 2,174,824 issued on Oct. 3, 1939, for "Portable Cooker". The patent discloses a cooker which uses as its heat source a canned heat or "Sterno". The arrangement disclosed does not include two separated portions adapted to provide higher and lower levels of heating through the use of an additional solid fuel as well as the Sterno fuel.

A further portable heating stove is shown in J. M. Higman U.S. Pat. No. 2,488,014 issued on Nov. 15, 1949, for "Sheet Metal Heating Stove". This patent shows a stove using solid fuel such as charcoal or briquets which is lighted by stuffing paper or rags saturated with a flammable fluid in order to ignite. The heating stove does not have the capability of dual level heat operation nor does it have the arrangement afforded by the present invention for easily incorporating or removing the receptacle for semi-solid fuel at the base of the heater.

A still further portable stove is disclosed and claimed in W. B. Seeley U.S. Pat. No. 936,482 issued on Oct. 12, 1909, for "Portable Stove". This patent discloses a rather simple arrangement of lamp plus enclosing shell in which the heat source is of a single heat level and originates with a lamp incorporated in the base of the stove.

A final prior art disclosure of a portable stove is included in T. E. Taylor U.S. Pat. No. 1,342,072 issued on June 1, 1920, for "Portable Stove". This patent includes a single enclosing shell with a grate for holding solid fuel content for heating operation. Again there is no disclosure of a dual heat level stove of the type shown and described in the instant application.

SUMMARY OF THE PRESENT INVENTION

The present invention will thus be seen to include a symmetrical body portion divided into upper and lower enclosures by an intermediate relatively permanently fixed grate. A pivotal lid is attached at the top of the upper portion and can be moved between a lower closed position for dampening the heater operation or to an upper open position for allowing maximum heat output. The upper portion of the heater is adapted to receive a solid fuel charge on the grate. The lower portion of the heater is adapted to hold in a resiliently clipped position a lower receptacle holding semi-solid fuel such as "canned heat" or STERNO. The heater is operable at a higher heat level in which the solid fuel on the upper side of the grate is ignited or at a lower level in which the solid fuel is omitted from the upper portion and the semi-solid fuel is ignited and fixed in the lower portion for lower heat output. It will be understood that normally the semi-solid fuel and its receptable are removed during the higher level operation once the solid fuel has been ignited. A plurality of spaced legs or feet are provided at the bottom of the stove for supporting it above the ground level. A plurality of openings are also provided around the periphery of the lower portion of the body to provide for inlet of air flow and for its circulation during the burning of either of the two fuels.

BRIEF DESCRIPTION OF THE DRAWINGS

The present invention will now be described with regard to the accompanying specification and the drawings in which like numerals are used for like parts as they may appear in the several drawing figures and in which.

DETAILED DESCRIPTION OF THE PREFERRED EMBODIMENT

Figure 1:
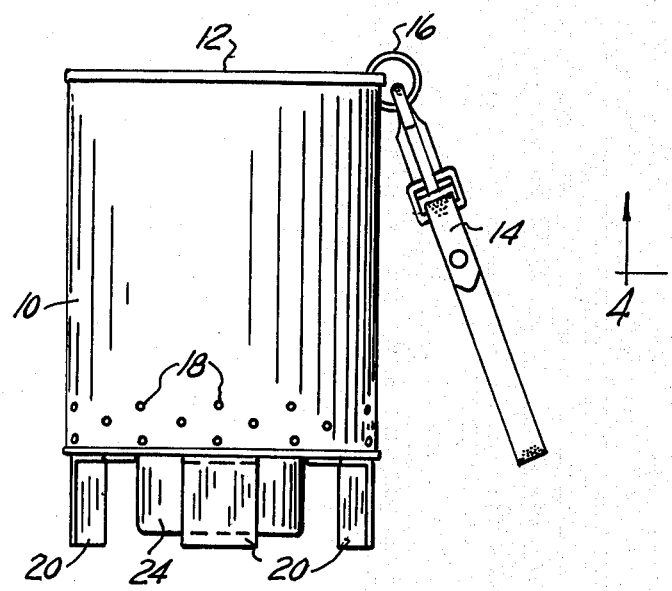
FIG. 1 is a front elevational view of the heater.

FIG. 1 shows the heater which includes a cylindrical body 10, a solid lid 12, and a carrying handle or belt loop 14. It will be seen that the lid 12 and the loop 14 are both attached to the upper end of the body 10 by a ring 16. The body 10 includes a plurality of openings 18 at its lower end to facilitate passage of air through the heater during its heating operation. The upper lid 12 is normally opened during such heating operation. Fixed to the lower surface of the body 10 are a plurality of legs 20 for supporting the heater above the ground or other surface level.

Figure 2:
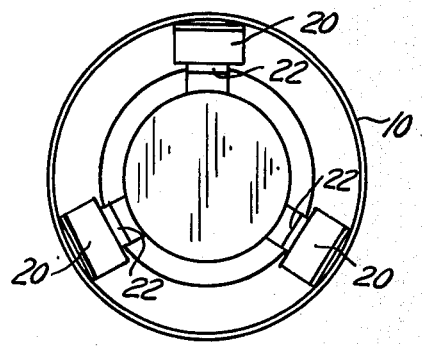
FIG. 2 is a bottom plan view of the device of FIG. 1.

FIG. 2 shows a plurality of resilient clips 22 which are used to releasably hold in place a receptacle 24 containing a semi-solid heating material 26 as better shown in FIG. 4 hereinafter. The receptacle 24 can easily be slipped in and out of position at the lower end of the cylindrical body 10 depending on which level of heating operation is desired. The legs 20 are attached by riveting welding or like to the lower surface of the body 10.

Figure 3:
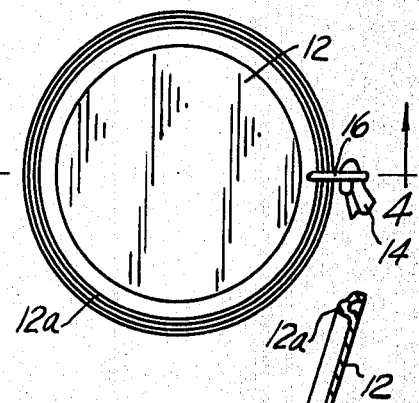
FIG. 3 is a top plan view of the heater of FIG. 1.

FIG. 3 shows the solid lid 12 in its lowered or dampening position and also shows the manner in which such lid is connected by the ring 16 to the upper edge of the body 10. A rim 12a may be included extending circumferentially about the lid 12 to provide for a snug fit of the lid 12 to the upper end of the body 10 in its closed position. It is in the lowered lid position that the dampening effect for extinguishing the fire results.

Figure 4:
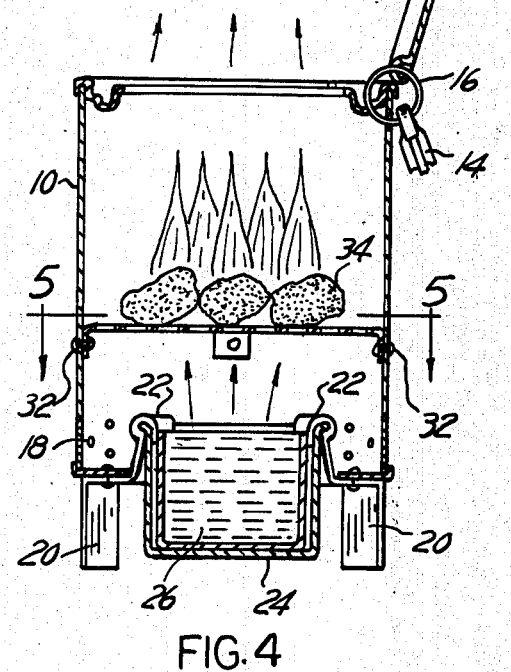
FIG. 4 is a cross-sectional view of the showing of FIG. 3 along the section lines 4—4.

FIG. 4 shows the lid 12 in its raised position with a high volume of heat exiting upwardly. The internal structure of the heater will now be seen to include the permanently installed grate 30 which is fastened to the interior surfaces of the body 10 by rivets 32 or by similar fastening means. The upper portion of the heater includes the solid fuel 34 shown as charcoal briquets. These are shown in their ignited or maximum heat producing condition. The lower portion of the heater is defined between the grate 30 and the bottom of the heater with the receptacle 24 for the semi-solid fuel 26. The resilient clips 22 are shown holding in place the receptacle 24. In the operation of the stove, the receptacle 24 is removed as soon as the charcoal 34 resting on grate 30 is ignited. In the lower heat level operation of the heater, the charcoal 34 is not loaded on the grate 30 but rather the entire heat output is taken from the ignited semi-solid fuel 26 in the receptacle 24.

Figure 5:
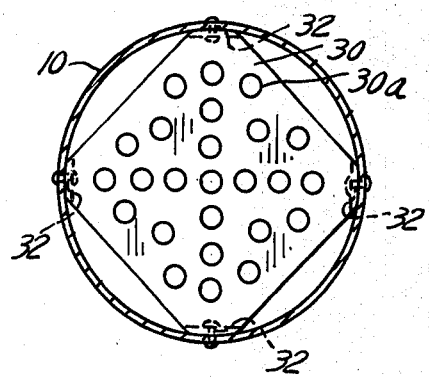
FIG. 5 is a cross-sectional view taken along the section lines 5—5 of FIG. 4.

FIG. 5 shows the general structure of the grate 30 including a plurality of spaced openings 30a freely admitting air flow through the grate 30 around and about the solid material 34.

It will thus be seen that I have provided by my invention a highly portable heater useful for hand warming by deer hunters, archers, fishermen or other sportsmen. Depending on the length of time the user is to be exposed to the elements and the temperature, the heater may be operated either at a relatively high heat output level through the use of solid fuel or at a relatively low level heat output by the use of semi-solid fuel such as Sterno.

I claim:

1. A portable heater operable in relatively high and relatively low heat output conditions comprising:
    a cylindrical body portion;
    a grate for dividing said body portion into an upper and a lower portion;
    said upper portion adapted to receive and hold solid fuel on the upper surface of said grate;
    said lower portion having an opening in its base and operable to receive and hold in resilient gripping relationship a receptacle for semi-solid fuel;
    a plurality of openings provided around the lower periphery of said lower portion of said heater; and
    a lid pivotally mounted at the upper end of said body portion for movement between a raised heating position and a lowered snuffing position of the heater.

2. The combination as set forth in claim 1 wherein a plurality of rigid legs are circumferentially mounted on the bottom surface of said body portion.

3. The combination as set forth in claim 1 wherein said lid and a carrying means are both mounted to the upper end of said body portion by a common ring.

4. The combination as set forth in claim 1 wherein said grate comprises a lateral member having a plurality of openings formed through it and permanently attached to the inner surface of said body portion by a plurality of fastening means.

5. The combination as set forth in claim 1 wherein in a plurality of spaced clips are mounted around the opening in the base of said lower portion for receiving and holding said receptacle.

6. The combination as set forth in claim 3 wherein said carrying means comprises a belt loop.

* * * * *